(12) United States Patent
Hedenberg

(10) Patent No.: US 7,077,408 B2
(45) Date of Patent: Jul. 18, 2006

(54) STABILIZING AIR SUSPENSION SYSTEM

(75) Inventor: William E. Hedenberg, Cox's Creek, KY (US)

(73) Assignee: ChassisPro, LLC, McDonough, GA (US)

( * ) Notice: Subject to any disclaimer, the term of this patent is extended or adjusted under 35 U.S.C. 154(b) by 245 days.

(21) Appl. No.: 10/718,229

(22) Filed: Nov. 20, 2003

(65) Prior Publication Data

US 2005/0110233 A1    May 26, 2005

(51) Int. Cl.
*B60G 11/32* (2006.01)
(52) U.S. Cl. ............................ 280/124.11; 280/124.162
(58) Field of Classification Search ............ 280/124.11, 280/124.104, 124.116, 124.162, 124.174; 267/31, 271
See application file for complete search history.

(56) References Cited

U.S. PATENT DOCUMENTS

| | | | | |
|---|---|---|---|---|
| 3,850,445 A | * | 11/1974 | Borns et al. | 280/124.163 |
| 4,518,171 A | * | 5/1985 | Hedenberg | 280/6.159 |
| 4,541,653 A | * | 9/1985 | Raidel | 280/124.109 |
| 4,966,387 A | * | 10/1990 | White, IV | 280/124.163 |
| 5,046,752 A | * | 9/1991 | Stephens et al. | 280/678 |
| 5,427,404 A | * | 6/1995 | Stephens | 280/124.162 |
| 6,398,243 B1 | * | 6/2002 | Hedenberg | 280/124.163 |

* cited by examiner

*Primary Examiner*—David R. Dunn
(74) *Attorney, Agent, or Firm*—Biddle & Associates, P.C.

(57) ABSTRACT

An improved air suspension system for the rear axle of a vehicle such as a light to medium duty truck. The system includes a torque arm extending forward of the axle with its forward end mounted on the frame and an intermediate point mounted on the axle. The rear end of the torque arm extends rearwardly of the rear axle and has a hanger bracket attached thereto. The forward end of a lever arm is supported on a shackle assembly that in turn is mounted on the hanger bracket, and the rear end of the lever arm is mounted on a bushing affixed to the chassis. An air spring is mounted on the lever arm and the air spring and lever arm support major portion of the vehicle weight.

10 Claims, 1 Drawing Sheet

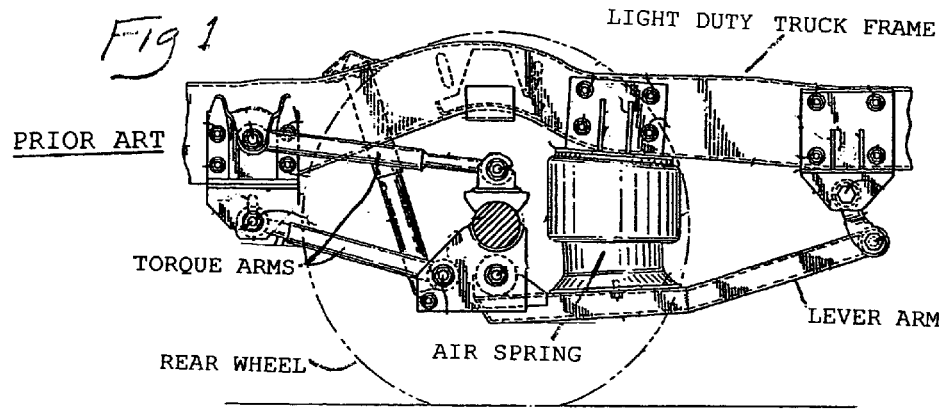
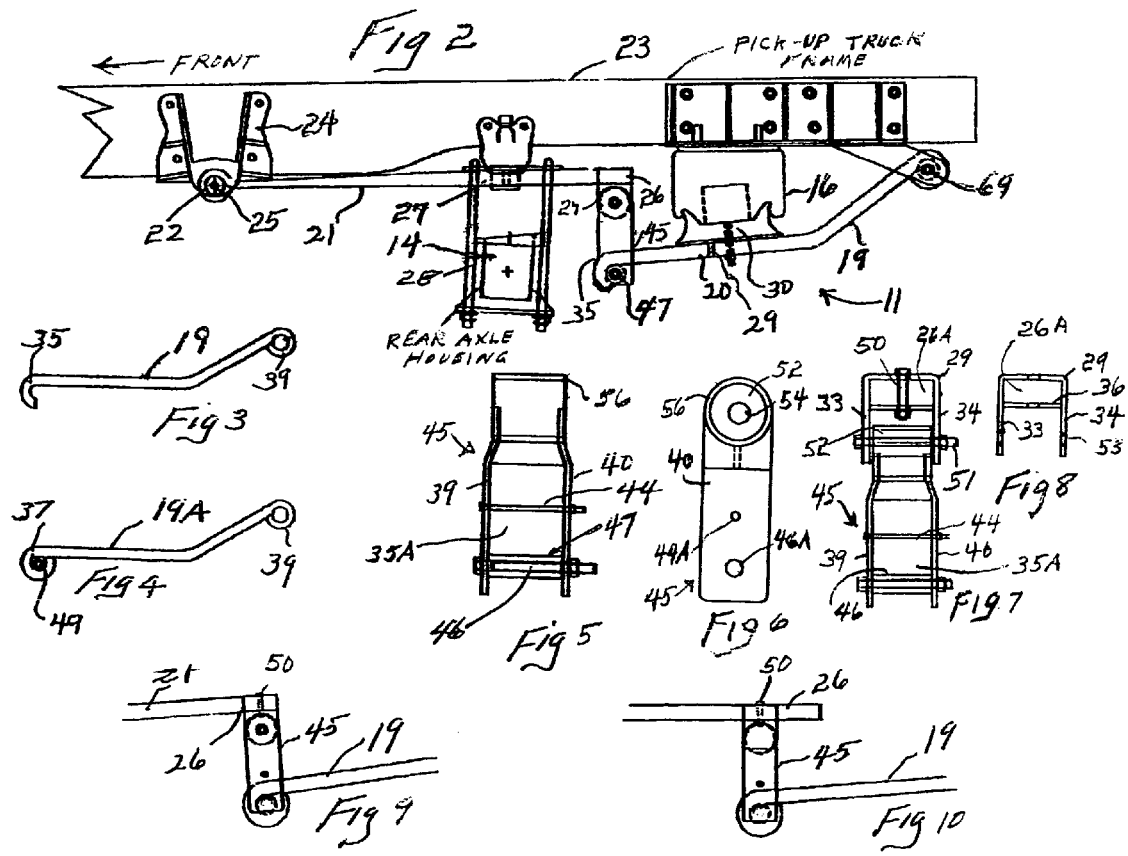

STABILIZING AIR SUSPENSION SYSTEM

BACKGROUND OF INVENTION

The present invention relates to air suspension systems of the type shown in U.S. Pat. No. 4,518,171 that are provided for improving the ride and stability of vehicles and for maintaining the vehicle level during acceleration and deceleration. Pat. No. 4,518,171 provided an air suspension system having a pair of torque rods that were pivotally attached to the axle housing and extended forward of the rear axle in a modified parallelogram linkage. The air suspension system included a lever arm extending rearwardly of the axle. The forward end of the lever arm was mounted underneath the axle and the rear end of the lever arm was pivoted on a hanger assembly. An air bag was mounted on the lever arm, and the air bag supported one hundred percent 100% of the load on the vehicle. The system of U.S. Pat. No. 4,518,171 operated better than any known prior art; however, the system was costly and it is the purpose of the present invention to provide a system which provides similar operating characteristics, but with a design that is much more economical.

SUMMARY OF INVENTION

An air suspension system for use with vehicles such as vans, pick-up trucks, and ambulances is disclosed. The system includes a torque arm that has its forward end mounted on the vehicle chassis at a position forward of the rear axle. The torque arm extends back toward the rear axle and is mounted over the rear axle. The rear or aft end of the torque arm extends rearwardly past the rear axle. The system includes a lever arm that has its forward end mounted on the rear end of the torque arm by means of a shackle assembly (in effect, the torque arm becomes a cantilever arm). A lever arm is mounted rearwardly of the rear axle and the rear end of the lever arm is mounted on a bushing affixed by brackets to the vehicle chassis. An air spring for the rear axle of the vehicle is mounted intermediate the ends of the lever arm. The air spring and the lever arm support the weight of the vehicle chassis and the load.

The foregoing features and advantages of the present invention will be apparent from the following more particular description of the invention. The accompanying drawings, listed herein-below, are useful in explaining the invention.

DESCRIPTION OF THE DRAWINGS

FIG. 1 labeled prior art shows a side view of applicant's prior invention disclosed in U.S. Pat. No. 4,518,171;

FIG. 2 shows a side view of the inventive system mounted on the frame of a vehicle such as a pick-up truck;

FIG. 3 shows a side view of one embodiment of the lever arm;

FIG. 4 shows a side view of a second embodiment of the lever arm;

FIG. 5 shows an end view of the shackle that is mounted on the hanger bracket and that supports the lever arm;

FIG. 6 shows a side view of a shackle of FIG. 5;

FIG. 7 shows an end view of the shackle assembly including the hanger bracket; and FIG. 8 shows an end view of the hanger bracket that is affixed to the torque arm;

FIG. 9 shows a side view of the mounting of the hanger bracket at the end of the torque arm;

FIG. 10 shows a side view of the mounting of the hanger bracket at a position spaced from the end of the torque arm;

DESCRIPTION OF THE INVENTION

FIG. 1 shows the structure of applicant's previous invention as disclosed in U.S. Pat. No. 4,518,171 and briefly described above. As mentioned above, the system shown in FIG. 1 functions extremely well, however it is somewhat bulky and expensive, and might be said to be over engineered.

Refer now to FIG. 2, showing the inventive air suspension system 11 that is particularly useful for the medium-to-light duty vans and trucks from ¾ ton up to a 15,000 pound rear drive axle; the invention is for vehicles having two axles. The air suspension system 11 is depicted as installed on the chassis or frame 23 of a vehicle adjacent the left rear wheel and on the rear axle housing 14 for rear axle 15 of the truck frame 23. It will, of course, be understood that a similar air suspension structure which comprises the other or right side of the system is installed adjacent to the right rear wheel on the rear axle housing 14 of the vehicle.

The air spring for the system 11 comprises a vehicle air spring (bag) 16 of any suitable known type, and is selected dependent on the load rating of the vehicle. The air spring 16 is mounted on an elongated lever arm 19 by a suitable base (seat) 30, and the top of the air spring 16 mounts underneath the chassis 23, as is known. Lever arm 19 extends longitudinally of the vehicle and transverse to the rear axle housing 14. The lever arm 19 may comprise one or more leafs of spring steel.

The system 11 is installed in what is termed a trailing lever arm position; i.e., the air spring 16 is directly mounted on the lever arm 19 which is mounted to extend rearwardly of the rear axle housing 14 (rearwardly relative to the longitudinal orientation of the vehicle). An intermediate section 20 of the lever arm 19 provides the mounting area for the base of the air spring 16.

As further shown in FIG. 2, the system 11 includes a torque arm 21 that, in one embodiment, comprises a single straight and elongated bar-like member; torque arm 21 may also be of spring steel. The forward end 22 of torque arm 21 comprises a loop or spring eye and is pivotally mounted on a bushing 25, held by a suitable bracket 24. Bracket 24 is affixed to the chassis 23. An intermediate section 27 of torque arm 21 is mounted on the axle housing 14 by a suitable U-bolt assembly 28. The rear end 26 of torque arm 21 extends rearwardly of the rear axle housing 14. A hanger bracket 29 (see also FIGS. 7 and 8) mounts a shackle assembly 45 (to be described in detail below) on the rear end 26 of torque arm 21.

Refer now generally to FIGS. 5, 6, 7 and 8. FIG. 8 separately shows the inverted U-shaped hanger bracket 29 that mounts onto the end 26 of torque arm 21 in the space 26A formed between the bight of the U-shape and a brace/bolt support 36. Refer back briefly to FIG. 2 that shows the position of hanger bracket 29 on the end 26 of torque arm 21. FIG. 7 shows a bolt 50 that secures hanger bracket 29 to the end 26 of the torque arm 21. Two spaced, downwardly depending side plates 33 and 34 of bracket 29 include bolt hole 53 for receiving bolt 51, see FIG. 8, that is used to mount a bushing 52 for supporting shackle assembly 45.

FIG. 6 shows the bushing 52 that has an internal sleeve 54 for receiving bolt 51. Bushing 52 is in turn mounted on a cylindrical bushing loop or pipe 56 that is part of the shackle assembly 45. FIG. 5 shows an end view of loop 56, and FIG. 6 shows a side view of loop 56. As best seen in FIG. 5, shackle 45 includes two spaced parallel downwardly extending support legs 39 and 40 that are welded to loop 56. A bolt 44 extends between legs 39 and 40 through holes 44A, and limits upward movement of the end 35 of lever arm 19. As mentioned above the loop 56 and legs 39 and 40 are mounted on bushing 52 that is, in turn, mounted on bolt 51, see FIG. 7. The support legs 39 and 40 can articulate (swing or move back and forth) on bushing 52.

The rear end of the torque arm 26 (refer again to FIG. 2) is received in space 26A formed between the closed part of member 31 and brace 36, and hanger bracket 29 is held in fixed position by bolt 50.

FIG. 7 shows that shackle assembly 45 includes the hanger bracket 29; that is, the hanger bracket 29 is a part of the overall shackle assembly 45. A steel sleeve spacer/bushing 47 is mounted at the lower end of the shackle 45 by a bolt 46 extending between legs 39 and 40. Bolt 46 extends through holes 46A in legs 39 and 40. Sleeve spacer/bushing 47 and bolt 46 provide the support for the end 35 of the lever arm 19 (see FIG. 2) in the space 35A formed between the legs 39 and 40, see also FIG. 9. As seen from FIGS. 2 and 7, the end 35 of the lever arm 19, is pivotably supported on sleeve spacer/bushing 47 of shackle assembly 45. The lever arm 19 is essentially in longitudinal alignment with the torque arm 21.

As mentioned above, the sleeve spacer/bushing 47 supports the forward end of the lever arm 19. As shown in FIG. 3, the forward end 35 of lever arm 19 may be generally in the form of an "L" or a "C" with the long end of the "L" being the lever arm. This configuration tends to minimize friction between the end 35 of lever arm 19 and the sleeve spacer/bushing 47.

Refer now to FIGS. 2, 3, 5 and 7. The limit bolt 44 affixed between plates 39 and 40 of the shackle assembly 45 allows approximately one-half inch of clearance from the top surface of the end 35 of the lever arm 19 to the bolt 44. Bolt 44 thus prevents upward displacement of the end 35 of lever arm 19. The L-shaped, or relatively open configuration of end 35 of lever arm 19 supported on sleeve spacer/bushing 47 reduces production costs, and importantly also minimizes any restrictive friction such as might be caused by a relative tight bushing when there is individual wheel or vertical axle articulation. Thus the unique shackle assembly 45 is structured to support lever arm 19 in a selected alignment relation to the torque arm 21 to provide adequate mounting space for the air spring, and to minimize friction between the lever arm 19 and the shackle 45 mounting.

In an alternative embodiment of the lever arm shown in FIG. 4, the lever arm 19A comprises an elongated steel beam or bar member having an eye or loop 37 formed on its front end. A bushing 49 can be pressed into loop 37 and mounted in shackle assembly 45 by bolt 46 without using a sleeve spacer/bushing 47.

It has been found that the mounting of the air spring 16 on the lever arm 19 will reduce the natural frequency of the air spring by approximately 12–15%; however, the presently used common trailing arm arrangement will increase the natural frequency of the air spring by about 12–15%. The air spring supports and isolates approximately 60% of the chassis load and road vibration. In effect, by merging the mechanical set-up of the two elements, the mechanical arrangement of this invention causes one factor to cancel out the other. The result is that the air spring maintains its initial natural characteristics of rate and frequency, in a one to one relation.

In another embodiment of the invention, and referring to FIGS. 9 and 10, by relocating the position of the hanger bracket 29 and thus of shackle assembly 45, forward a short interval of two or more inches on the torque arm 21, other weight bearing parameters are obtained This is readily done by providing suitable mounting hole for mounting bolt 50, as indicted in FIG. 10. This positions the forward end of the lever arm 19 relatively closer to the rear axle, and also positions the air spring 16 relatively more forward toward the rear axle.

Note, of course, that the torque arm 21 and, or the lever arm 19 may varied in length to accommodate various models of vehicles. However the capability of simply moving the position of the shackle assembly 45, including hanger bracket 29, as indicated in FIG. 10, to accommodate various types of vehicles enables the torque arm 21 and the lever arm 19 to be standardized for a number of different models such as light to medium duty trucks.

The arrangement of the torque arm clamped to the axle and forward to a pivot causes this system to become "torque reactive". This method prevents axle "wind-up", chassis pitch or rear-end squat during acceleration and front-end nose-dive upon braking. This check of axle "wind-up" will maintain a constant pinion angle that eliminates drive-line vibration and prolongs universal joint life. Also, the rigid clamp of the torque arm at the axle prevents chassis roll and yaw, thus eliminating the need of a roll or sway bar assembly.

Note also that the position of the air spring 16 can be positioned on the chassis 23 and on the lever arm 19 dependent on the load bearing requirements by providing various attachment points (indicated at hole 29 in FIG. 2) of the air spring to the lever arm. Thus, the load characteristics of the system 11 can be conveniently tailored for several load bearing classes of vehicles.

Further, the geometric arrangement of the lever arm reduces the air spring vertical travel 25% less than that of the axle, thus prolonging the life of the air spring.

In one embodiment of the invention, as shown in FIG. 1, tests have indicated that the lever arm and air spring supports and isolates 78% of the chassis load and road vibrations. More specifically, for this test the forward end of the lever arm was placed in a shackle that is vertically connected at the rear end of the cantilever arm. This construction displaces approximately 22% of the chassis load into the cantilever arm and hanger bracket forward of the axle. The following calculations were made on the aforementioned embodiment. The distance from the center of forward hanger 24 and center of the cantilever bushing 25 to the center of the axle 16 is 24.92 inches. The distance from the forward hanger 24 center and center of the cantilever bushing 25 to the center of shackle 45 is 31.94 inches The distance of 24.92 inches divided by the distance of 31.94 inches gives the decimal 0.78; hence, the system provides a 0.78 lifting ratio at the rear shackle position 69 of lever arm 19 and a 0.22 percentage vertical load at the front hanger 24.

In the aforesaid embodiment, the measurement between the center of shackle 45 and the forward end of the lever arm 19 to the center of the air spring is 9.88 inches. The center of the air spring center to lever arm rear pivot center (bushing 69) is 19.13 inches. The distance between the shackle 45 and forward pivot point of the lever arm 19 to the rear pivot point (69) 5 of the lever arm is 29.01 inches. The 29.01 inches divided by 19.12 inches results in a 1.51 lever arm ratio.

Additional calculations were made as follows:

| VEHICLE STATIC LOADS (in pounds) | | |
|---|---|---|
| Empty Maximum | Empty | Max |
| Sprung load on axle each side | 1,021 | 2,792 |
| Cantilever arm/shackle ratio | × .78 | × .78 |
| Cantilever arm sprung load at shackle | 796.38 | 2,177.76 |
| Lever arm ratio | × 1.51 | × 1.51 |
| Sprung load at air spring | 1,205.5 | 3,288.41 |

-continued

VEHICLE STATIC LOADS (in pounds)

| Empty Maximum | Empty | Max |
|---|---|---|
| Divided by air spring effective area | 32 | 32 |
| Air spring pressure (psi) | 37.5 | 102.76 |
| Sprung vertical load at OEM front hanger | 225.0 | 614.0 |

While the invention has been particularly shown and described with reference to preferred embodiments thereof, it will be understood by those skilled in the art that various changes in form and details may be made therein without departing from the spirit and scope of the invention.

The invention claimed is:

1. An air suspension system for a vehicle having a chassis, a front axle housing and a rear axle housing; said system comprising;
   a) an elongated torque arm having a forward end, an intermediate section and a rear end; the forward end of said torque arm being pivotally mounted to said chassis, said intermediate section being mounted over said rear axle housing, and the rear end of said torque arm extending rearwardly of said rear axle housing;
   b) shackle assembly mounted on said rear end of said torque arm;
   c) an elongated lever arm having a forward end, an intermediate section and a rear end, said lever arm having it rear end pivotably mounted to said chassis;
   d) said shackle assembly supporting said forward end of said lever arm;
   e) an air spring mounted on said intermediate section of said lever arm between said lever arm and said chassis to provide load support to said chasis; and
   f) said shackle assembly connects with said lever arm at a point that is located between the air spring and the axle housing.

2. An air suspension system as in claim 1 wherein said shackle assembly is mounted at a spaced distance from said rear end of said torque arm.

3. An air suspension system as in claim 2 wherein said distance is two to four inches from said rear end.

4. An air suspension is in claim 1 wherein the front end of said lever arm has a C-shaped loop that contacts said shackle assembly.

5. An air suspension system is in claim 1 wherein the front end of said lever arm as a an O-shaped loop or eye that contacts said shackle assembly.

6. An air suspension system has in claim 1 wherein said shackle assembly includes a first bushing for enabling articulation of the shackle assembly relative to said torque arm, and wherein said shackle includes a second bushing for enabling articulation of said lever arm relative to said shackle assembly.

7. An air suspension system as in claim 1 wherein said shackle assembly enables a double articulation action.

8. An air suspension system for a vehicle having a chassis, a front axle housing and a rear axle housings; said system comprising;
   a) an elongated torque arm having a forward end, an intermediate section and rear end;
   b) means for pivotably mounting the forward end of said torque arm to said chassis;
   c) means for fixedly mounting the intermediate section of said torque arm on said rear axle housing,
   d) said rear end of said torque arm extending rearwardly of said rear axle housing;
   e) a shackle assembly mounted to the rear end of said torque arm and extending downwardly from said torque arm;
   f) an elongated lever arm having a forward end, an intermediate section and a rear end;
   g) a bracket for pivotably mounting the rear end of said lever arm to said chassis;
   h) said shackle assembly supporting said forward end of said lever arm;
   i) an air spring mounted on said intermediate section of said lever arm between said lever arm and said chassis to provide load support to said chassis; and
   e) said shackle assembly connects with said lever arm at a point that is located between the air spring and the axle housing.

9. An air suspension system for a vehicle having a chassis a front axle and one rear axle and an associated axle housing; said system comprising;
   a) an elongated torque arm having a forward end, an intermediate section and a rear end; the forward end of said torque arm being pivotally mounted to said chassis, the intermediate section of said torque arm being mounted on said rear axle, and a rear end of said torque arm extending rearwardly of said rear axle;
   b) an elongated lever arm having a forward end, an intermediate section and rear end, said lever arm having its rear end pivotably mounted to said chassis;
   c) a shackle assembly including a hanger bracket that mounts on the rear end of said torque arm in a position rearward and adjacent said axle, and said shackle assembly including a first bushing and legs that support the forward end of said lever arm, said legs being mounted on said bushing and can articulate on said bushing;
   d) an air spring mounted on a section of said intermediate section of said lever arm between said lever arm and said chassis to provide load support to said chassis; and
   e) said shackle assembly connects with said lever arm at a point that is located between the air spring and the axle housing.

10. An air suspension system for a vehicle comprising;
   torque arm having a forward end, an intermediate section and a rear end;
   shackle assembly mounted on said rear end of said torque arm;
   lever arm having a forward end, an intermediate section and a rear end;
   air spring configured to be mounted between the intermediate section of the lever arm and a vehicle chassis;
   the forward end of the torque arm is configured to be pivotally mounted to a vehicle chassis,
   the torque arm is configured so that when the system is mounted to a vehicle, the intermediate section of the torque arm is located over a vehicle rear axle housing and the rear end of the torque arm extends rearwardly of the vehicle rear axle housing;
   the lever arm is configured so that the rear end of the lever arm may be pivotally mounted to a vehicle chassis; and
   the shackle assembly is configured to connect with the lever arm at a point that is located between the air string and the axle housing.

* * * * *